(12) United States Patent
Machitani et al.

(10) Patent No.: US 6,925,362 B2
(45) Date of Patent: Aug. 2, 2005

(54) METHOD OF PROVIDING SERVICE WHICH MAKES POWER DISTRIBUTION OPERATION EFFECTIVE, AND SYSTEM

(75) Inventors: Yoichi Machitani, Hitachinaka (JP); Tomonobu Uchida, Kukizaki-machi (JP); Nobuyuki Ogura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 10/315,219

(22) Filed: Dec. 10, 2002

(65) Prior Publication Data

US 2003/0110146 A1 Jun. 12, 2003

(30) Foreign Application Priority Data

Dec. 10, 2001 (JP) ........................................ 2001-375142

(51) Int. Cl.[7] ............................................. G06F 17/00
(52) U.S. Cl. ...................... 700/286; 700/22; 705/412
(58) Field of Search .......................... 700/22, 28, 32, 700/286, 291, 295; 705/8, 412

(56) References Cited

U.S. PATENT DOCUMENTS

| | | | | |
|---|---|---|---|---|
| 5,422,561 A | * | 6/1995 | Williams et al. | ............. 323/209 |
| 5,734,586 A | * | 3/1998 | Chiang et al. | ............... 700/286 |
| 5,758,331 A | * | 5/1998 | Johnson | ....................... 705/412 |
| 5,794,212 A | * | 8/1998 | Mistr, Jr. | ....................... 705/26 |
| 6,549,880 B1 | * | 4/2003 | Willoughby et al. | ........... 703/13 |
| 6,681,154 B2 | * | 1/2004 | Nierlich et al. | ............. 700/286 |
| 6,785,592 B1 | * | 8/2004 | Smith et al. | ................ 700/291 |

* cited by examiner

*Primary Examiner*—Paul Rodriguez
(74) *Attorney, Agent, or Firm*—McDermott Will & Emery LLP

(57) ABSTRACT

A method and system for calculating profits shared between a power distribution company and a service provider, wherein the power distribution company purchases and resells electric power. The service provider provides consultation service to the power distribution company for planning an optimum power distribution system for increasing power distribution efficiency. The power distribution company shares profits with the service provider based on the measured value of the efficiency of the power distribution operation.

1 Claim, 9 Drawing Sheets

METHOD OF PROVIDING SERVICE WHICH MAKES POWER DISTRIBUTION OPERATION EFFECTIVE, AND SYSTEM

BACKGROUND OF THE INVENTION

The present invention relates to the service for increasing the efficiency in the power distribution business and its system by means of minimizing the electric power loss in the power distribution system or by implementing the plant and equipment investment effectively for the power distribution system.

Conventionally, calculations of efficiency gains in power distribution operations have depended heavily on subjective judgment of the operator. In general, as the power distribution companies give priority to the reliability of the power distribution system or the reliability of the electric power supply rather than its economical operation, correctness of the performance and efficiencies of the power distribution operations have not been verified.

Generally, the efficiency increase in the power distribution operation is provided as part of the power distribution efficiency increasing system, in which a relatively large scale investment on the plant and equipment including the introduction of the remote-operated circuit breakers and switches and sensors is needed.

In connection with the power liberalization movement, the importance of strengthening of the baseline of the management operation increases for the power distribution companies. It is commonly recognized that the optimization of the plant and equipment investment and the cost reduction of the electric power supply are specifically prime tasks among other things.

And furthermore, as described above, the efficiency increase in the power distribution operation conventionally depended heavily on the subjective judgment of the operator and the performance and effect in the economical operation has not verified explicitly, which makes an insecure business model.

In addition, a relatively large scale investment on the plant and equipment is inevitable for increasing the efficiency in the power distribution operation.

SUMMARY OF THE INVENTION

An object of the present invention is to provide a power distribution efficiency increasing service and a power distribution efficiency increasing system which enables to increase the operation of the power distribution without plant and equipment investment and to verify explicitly its effect (ROI: Return On Investment) contributing to strengthening the baseline of the management operation of the power distribution company.

In order to attain the above object, the power distribution efficiency increasing service of the present invention comprises a means for planning the optimum power distribution system to be established with initial investment by the service provider, a means for providing a consultation for increasing the efficiency in the power distribution, a means for introducing the system for measuring the revenue money obtained by the power distribution efficiency increasing service and a means for measuring the usage rate of the optimized power distribution system.

In addition, in order to attain the above object, the power distribution efficiency increasing system of the present invention comprises a measuring device of the purchased power of the power distribution company, a means for transmitting the measured data of the purchased power and the operation information of the power distribution system to the service provider, a means for receiving the measured data, a computer for calculating the optimum power distribution system pattern, a computer for calculating the usage rate of the optimized power distribution system and a computer for calculating the revenue money obtained by the optimization.

The other characteristics of the present invention are as described in the scope of claim for patent, and those characteristics will be described individually below.

The power distribution efficiency increasing service providing method of the present invention is characterized by that for the individual power distribution systems connected to plural power distributed points (that is, electric power customer in principle, and hereinafter referred to as this), the information on the improved system pattern obtained by modifying the system pattern for reducing the power loss is provided, and the power loss reduction effect with this improved pattern is measured and calculated. In this case, it is preferable that the service charge corresponding to the calculated effect is collected from the power distribution company.

In addition, the power distribution efficiency increasing service providing method of the present invention is characterized by that the power distribution system is configured and operated appropriately (which means to reducing the loss much more, or to minimize, that is, optimize the loss, and hereinafter, the term of optimize or optimization will be used for simplifying the explanation, but the scope of the present invention is not limited by the term of optimize) and then profits generated as a result of the efficiency improvement are determined based on the measurement result of the optimization effect. More specifically, (1) a method is provided for configuring an optimum power distribution system for minimizing the power loss in the power distribution system, by modifying the combination of the open-circuit state and the closed-circuit state of the circuit breakers or switches in the power distribution system; (2) a method is provided for configuring an optimum power distribution system so as to suspend a plant and equipment investment by modifying the layout of equipment on the electric circuit including circuit breakers, switches or other devices forming the power distribution system, or by removing the equipment; and (3) a method is provided for configuring an optimum power distribution system in which both the first pattern for modifying the power distribution system optimized for reducing the electric power loss in the power distribution system, obtained by modifying a combination of the open-circuit state and the closed-circuit state of circuit breakers or switches in the power distribution system; and the second pattern for modifying the power distribution system enabled to suspend a plant and equipment investment by modifying a layout of equipment on the electric circuit including circuit breakers, switches or other devices forming the power distribution system, or by removing the equipment are considered with a predefined weight.

Paying attention to the electric power volume purchased from the power generation company or the power generation division of the electric company (hereinafter referred directly to as power generation company) by the power distribution company of the power distribution division of the electric power company (hereinafter referred directly to as power distribution company), it is preferable that the purchased electric power volume before introducing the power distribution efficiency increasing service (hereinafter referred directly to as pre-introduction) and the purchased electric power volume after introducing the power distribution efficiency increasing service (hereinafter referred directly to as post-introduction) are measured in a constant period of time individually, and that the effect brought by the power distribution efficiency increasing service is estimated based on the difference between the pre-introduction electric power volume and the post-introduction electric power volume. It is allowed that the power generation company is identical to the power distribution company.

In addition, it is preferable that the service provider provides a consultation service for increasing the power distribution efficiency. In this case, the consultation service provided to the power distribution company by the service provider includes timely information service for the comprehensive know-now for operating the power distribution system such as the supervisory and control of the power distribution system, the construction and engineering works for the power distribution lines, the recovery from the accident in the power distribution system and the investment program for the power distribution equipment.

In addition, it is effective that the service provider implements the initial investment and provides either or both of the installation of the system for measuring the effect brought by the power distribution efficiency increasing service and the production of the software for planning the optimum power distribution system, and that, as for the contingent on success, the profit from the power distribution efficiency increasing service may be shared by the power distribution company and the service provider or obtained as the service charge. In the later case, it is specifically effective that the service provider receives the operation record information from the power distribution company and estimates the usage rate of the optimum power distribution system based on this information, and the service provider may determine alternatively to receive the divided profit brought by the power distribution efficiency increasing service or to receive the service charge considering the estimated usage rate of the optimum power distribution system.

The power distribution efficiency increasing method of the present invention is characterized by that the power distribution company receives the information from the service provider company regarding the improved system pattern obtained by modifying the existing system pattern in order to reduce the power loss for the power distribution system connecting the plural electric power customers in the service area of the power distribution company, and that the power distribution company pays the charge corresponding to the estimated value obtained by measuring the power loss reduction effect brought by the improved system pattern to the service provider company. In this case, it is preferable that the service charge is kept fixed for a constant period of time negotiated in advance or defined to be a divided amount shared with the profit of the power distribution company.

For the power distribution efficiency increasing system, it is especially effective that (1) the measuring device for the electric power purchased by the power distribution company is installed at the power receiving equipment in the power distribution company importing the electric power from the power generation company, or (2) the transmitting device and the receiving device use Internet, the public telephone network or the private communication network.

In the claims of the present invention, the term of optimization includes such a context as the effect of the power loss reduction could be obtained or expected, and thus, such a case that a little effect is obtained at all may be included in the context of optimization as defined in the present invention.

DETAILED DESCRIPTION OF THE INVENTION

Figure 1:
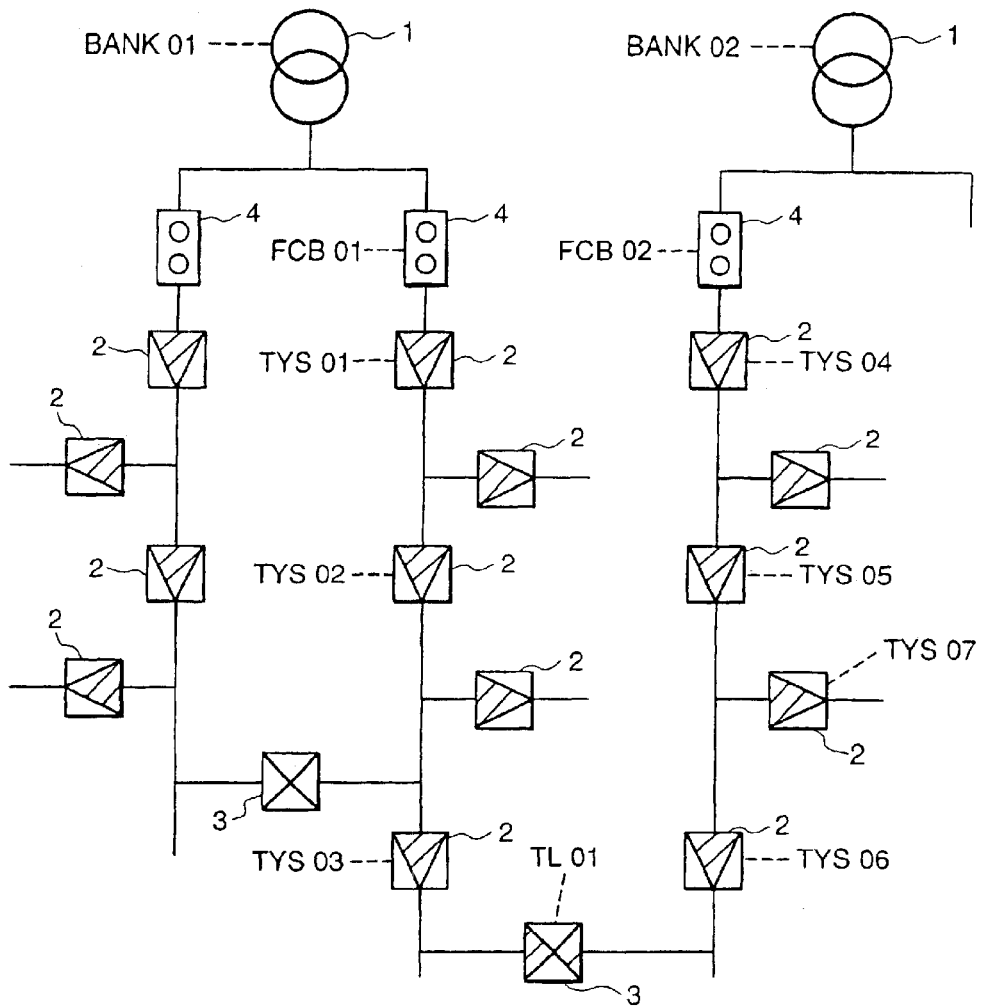
FIG. 1 is an illustration showing an example of the power distribution system.
Figure 2:
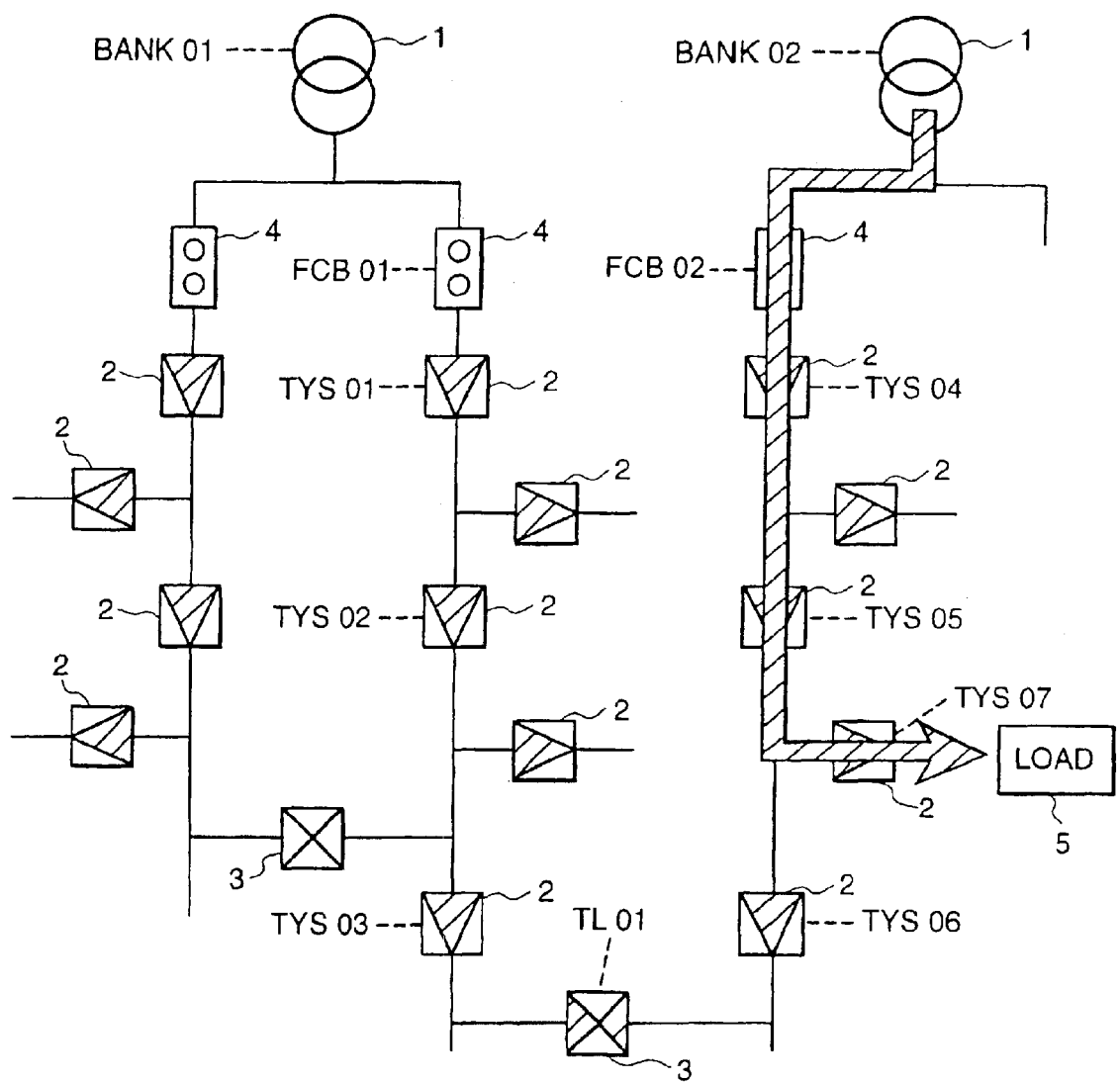
FIG. 2 is an illustration showing an example of the power distribution system.
Figure 3:
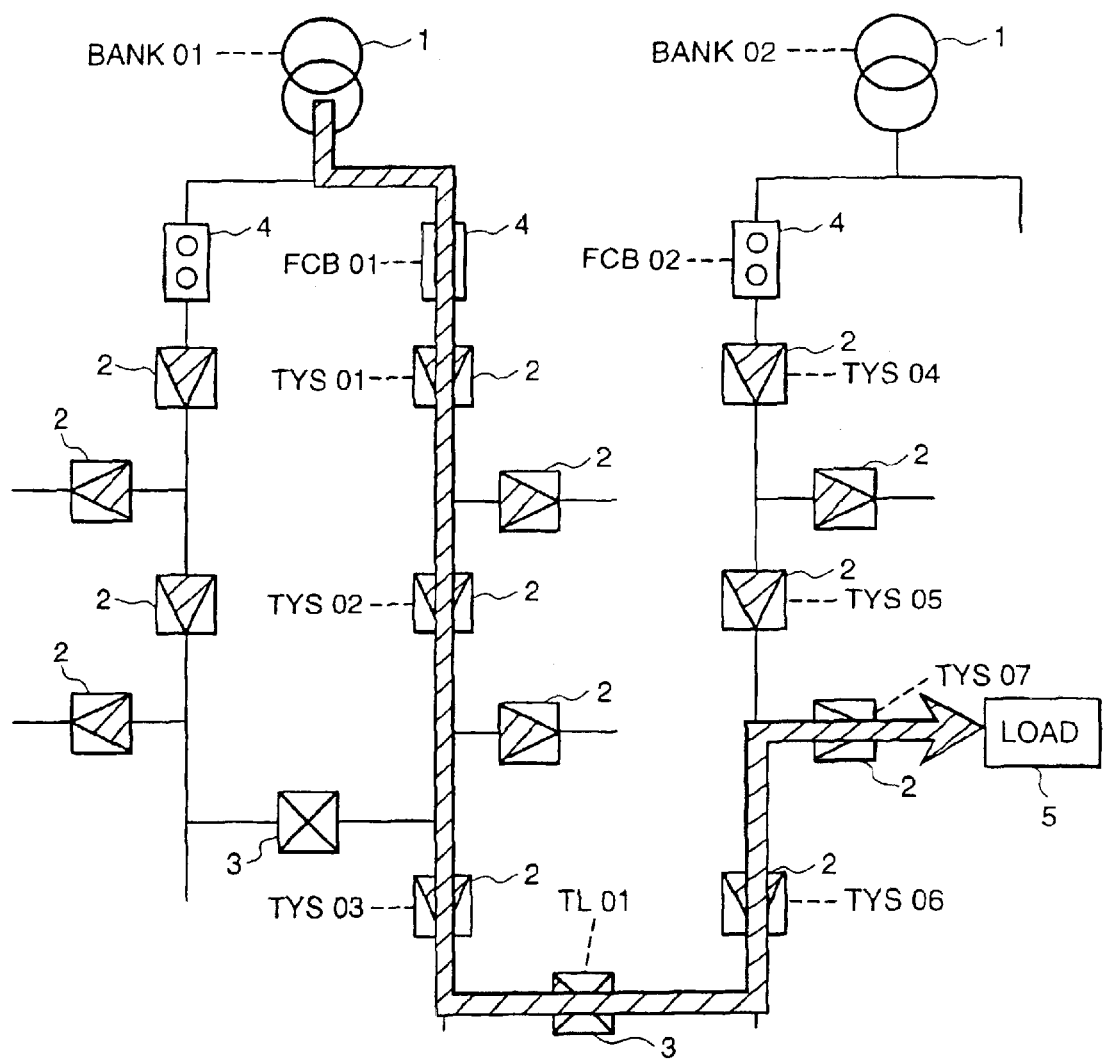
FIG. 3 is an illustration showing an example of the power distribution system.

Now, referring to FIGS. 1 to 3, the present invention is disclosed in the preferred embodiment. At first, modification of the power distribution system pattern is described with the preferred embodiments.

According to this embodiment, the efficiency of the power distribution system is increased in the following method. By modifying the open and close pattern of the circuit breakers or the switches in the power distribution system, an optimum pattern of the power distribution system making the electric loss minimized can be obtained without altering the condition for supplying the electric power to the electric power customers.

FIG. 1 shows an example of a part of the power distribution system to which the efficiency increasing service of this embodiment is applied, in which what is shown is a part of the patterned power distribution system comprising power distribution substation transformer 1 (=BANK01, 02 . . . ), section switches 2 (=TYS01, 02, 03, 04, 05, 06, 07 . . . ), cooperating switches 3 (=TL01 . . . ) and feeder circuit breakers 4 (=FCB01, 02 . . . ).

The electric power purchased from the power generation company is supplied from the primary side of the power distribution substation transformer 1, and the voltage of which is reduced. The purchased electric power flows into the power distribution system through the feeder circuit breakers 4. The section switches 2 and the cooperating switches 3 in the power distribution system have their own open-circuit state or closed-circuit state, respectively, and define a specific pattern of the power distribution system.

FIG. 2 shows a route for supplying the electric power to the load 5 in a given power distribution system pattern. The electric power is supplied to the load 5 through the route starting at BANK02 in the power distribution substation transformer 1 connected next to FCB02 as the feeder circuit breaker 4, connected next to TYS04 as the section switch 2, connected next to TYS05 as the section switch and finally through TYS07 as the section switch.

FIG. 3 shows another example of the route for supplying the electric power to the load 5 in a given power distribution system pattern defined by modifying the open and close state of the section switches 2 different from the example shown in FIG. 2. More specifically, in the power distribution system in FIG. 3 compared to what shown in FIG. 2, in which TYS05 as the section switch 2 is turned from the closed-circuit state to the open-circuit state and TYS06 as the section switch is turned from the open-circuit state to the closed-circuit state, resultantly, the electric power is supplied to the load 5 through the route starting at the BANK01 in the power distribution substation transformer 1 connected next to FCB01 as the feeder circuit breaker 4, connected next to TYS01 as the section switch 2, connected next to TYS02 as the section switch, connected next to TYS03 as the section switch, connected next to TL01 as the cooperating switch 3, connected next to TYS06 as the section switch 2 and finally through TYS07 as the section switch.

Comparing the case of supplying the electric power through the route shown in FIG. 2 with the case of supplying the electric power through the route shown in FIG. 3, it is proved that the electric loss in the individual route differs from each other due to the difference in the impedance of the power distribution cable and the distance between the power source to the load. To obtain an optimum power distribution system enabling to minimize the power distribution loss is equivalent to select a single pattern for minimizing the power distribution loss among several patterns, each having an individual combination of open and closed states of the circuit breakers and the switches in the power distribution system in the area covered by a given service. As the calculation for selecting an optimum pattern by using a computer consumes an extended time period, it is general to apply such a method as Genetic Algorithm (GA algorithm) in order to obtain an approximate solution in a shorter time period.

For the supplementary note, the functions of the section switch 2 and the cooperating switch 3 are described here. Both of the section switch 2 and the cooperating switch 3 are switches operating on an electric circuit and have an identical electric function. Their difference is only determined by their positions placed in the electric circuit. Their operational roles change in connection with their positions.

As for the section switches 2, the electric power customers are connected to the individual branches in the power distribution system configured in a tree structure (in which only a single route is established between the power source to the individual electric power customer (load)), in which the section switch is located so as to form an individual small-sized group of customers. For example, in urban areas, the distribution system is divided into a set of sections by the section switches, each arranged for 3 to 10 customers. Though all the customers (loads) are not illustrated explicitly in such a figure as shown by FIG. 1 in general, plural customers are connected practically to the sections before and after the individual section switch. In the power distribution system configured in a tree structure, once the section switch is turned OFF, the electric power to be supplied to the customers located in the down stream of this section switch is broken down. In a practical operation, when an accident occurs in the power distribution system, the cooperating switches are combined in order to minimize the area of power failure.

The cooperating switch 3 is a switch for coupling the sections of the power distribution system configured in a tree structure, and is normally turned OFF in Japan. When the cooperating switch is turned ON, there may occur such a case that several sections form a loop. This means that plural power supply routes are formed from the power source to the customer. Owing to this configuration, the reliability in the power supply can be increased. In a example of using the cooperating switch, the cooperating switch is normally turned OFF, and in case that an accident in the power distribution system occurs, the disabled section due to the accident is isolated by the section switches and then the cooperating switch is turned ON, which makes it possible to supply the electric power from the another section in the branching power distribution system to the operable sections located in the down stream of the disabled section due to the accident.

It is difficult to establish several alternative routes from the power source to the customer only by using the section switches. As alternative power distribution patterns can be established by supplying the electric power from the other power sources through the cooperating switches, what can be obtained is such a pattern of switches individually turned ON or OFF as minimizing the power distribution loss can be minimized.

In the method of one embodiment of the present invention, the electric power volume purchased from the power generation company by the power distribution company before and after introducing the power distribution efficiency increasing service; the profit money obtained by introducing the power distribution efficiency increasing service is calculated based on the difference between the electric power volume before and after its introduction; the profit money is divided based on the contract concluded between the power distribution company and the service provider or the service charge is paid from the power distribution company to the service provider.

At first, before introducing the power distribution efficiency increasing service, the purchased electric power to be distributed to the service area of the distribution company is measured in a given time period. Next, the purchased electric power is measured in a given time period after introducing this service. The effect of this service is defined as the reduced volume of the purchased electric power for the power distribution company by comparing the pre-service operation with the post-service operation.

The given time period described above is defined to be sufficiently long such that the defined period is insensitive to changes in day-to-day or seasonal power demand and/or unscheduled events. This given time period is defined to be one year in the following description.

Though the effect obtained by the power distribution efficiency increasing service can be calculated based on the result of measuring the electric power volume purchased by the power distribution company as described above, the electric power demand (or the electric power volume purchased by the power distribution company) changes irregularly and annually due to the climatic conditions and the increase and decrease in the number of customers in general. This change should be considered in calculating the effect obtained by the power distribution efficiency increasing service.

Figure 4:
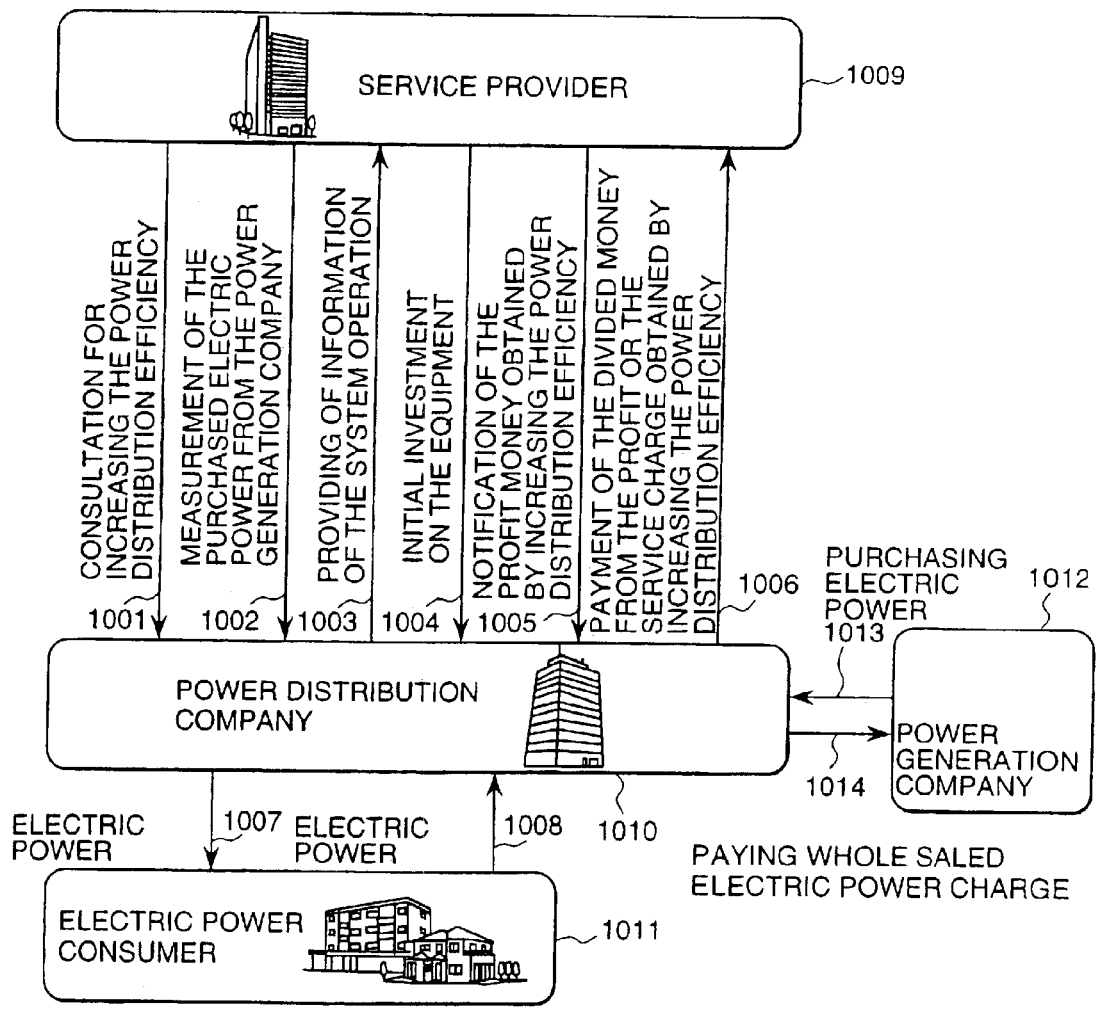
FIG. 4 is an illustration showing a configuration of the power distribution efficiency increasing service in one embodiment of the present invention.

By referring to FIG. 4, one embodiment of the present invention is described. FIG. 4 is a work flow showing a basic configuration of the power distribution efficiency increasing service.

The contract for the power distribution efficiency increasing service is concluded between the power distribution company 1010 and the service provider 1009. The power distribution company 1010 purchases (1013) the electric power from the power generation company 1012 and pays (1014) the retail sales electricity bills to the power generation company 1012. In addition, the power distribution company 1010 sells (1007) retail of the electric power to the electric power customer 1011, and collects (1008) the electricity bills. If the power distribution company 1010 increases the efficiency in the power distribution operation, the electric power volume purchased from the power generation company can be reduced without making effect to the power supply to the electric power customer 1011. In other words, it can be interpreted qualitatively that the wholesale electricity bills to be paid to the power generation company 1012 can be reduced without sacrificing the collected amount of electricity bills from the electric power customers 1011, and that the cost reduction can be realized in the power distribution operation.

The service provider 1009 initially invests (1004) initial capital for the plant and equipment to the power distribution company 1010 according to the contract concluded between the power distribution company 1010 and the service provider 1009. The initial capital investment (1004) to the plant and equipment covers the measuring system for measuring the effect obtained by the power distribution efficiency increasing service, the construction of the equipment data base and the installation of the computer system for calculating an optimum power distribution system pattern, which will be described later.

In addition, the service provider 1009 provides (1001) the consultation for increasing the power distribution efficiency, and the power distribution company 1010 implements the operation for increasing the power distribution efficiency and feeds back (1003) its operation information to the service provider 1009. The measured values for the electric power volume purchased from the power generation company 1012 is collected (1002) by the service provider 1009. The service provider 1009 calculates the profit money obtained by increasing the power distribution efficiency from the above information, and notifies (1005) it to the power distribution company 1010. The service provider 1009 receives (1006) the divided money corresponding to this profit money or the fixed service charge from the power distribution company 1010.

Figure 5:
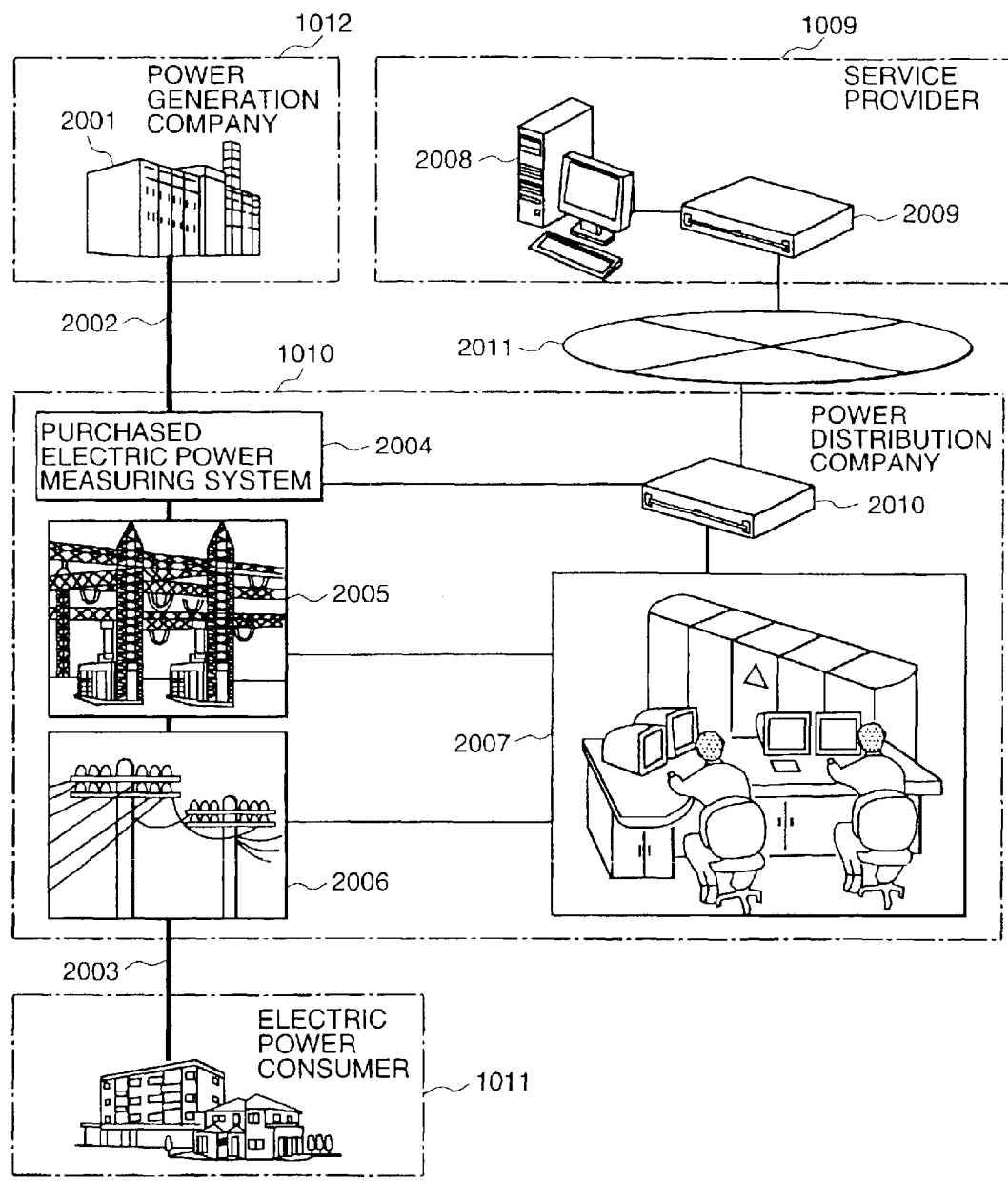
FIG. 5 is an illustration showing a configuration of the power distribution efficiency increasing service in one embodiment of the present invention.

FIG. 5 is a system configuration diagram illustrating one mode of the embodiment of the present invention. The electric power generated at the power generation facility 2001 of the power generation company 1012 is supplied to the power transforming facility 2005 of the power distribution company through the power distribution line 2002, and then supplied from the power distribution system facility 2006 to the electric power customer 1011 through the power distribution line 2003.

The power distribution system supervisory and control system 2007 supervises and controls the power distribution system facility 2006 and the power transforming facility 2005 in the power distribution company 1010. The operation information of the power distribution system facility 2006 is stored in the power distribution system supervisory and control system 2007. The electric power volume purchased from the power generation company 1012 by the power distribution company 1010 is measured by the purchased electric power measuring system 2004. The operation information of the power distribution system facility 2006 and the measurement data of the purchased electric power measuring system 2004 are transmitted periodically to the service provider through the communication unit 2010, and the public network or the private network 2011.

The service provider 1009 has the communication unit 2009 and receives the data from the power distribution company 1010. In addition, the service provider has the computer 2008, in which an optimum power distribution system pattern is calculated, the usage rate of the optimized power distribution system and the profit money obtained by the optimization is calculated.

Figure 6:
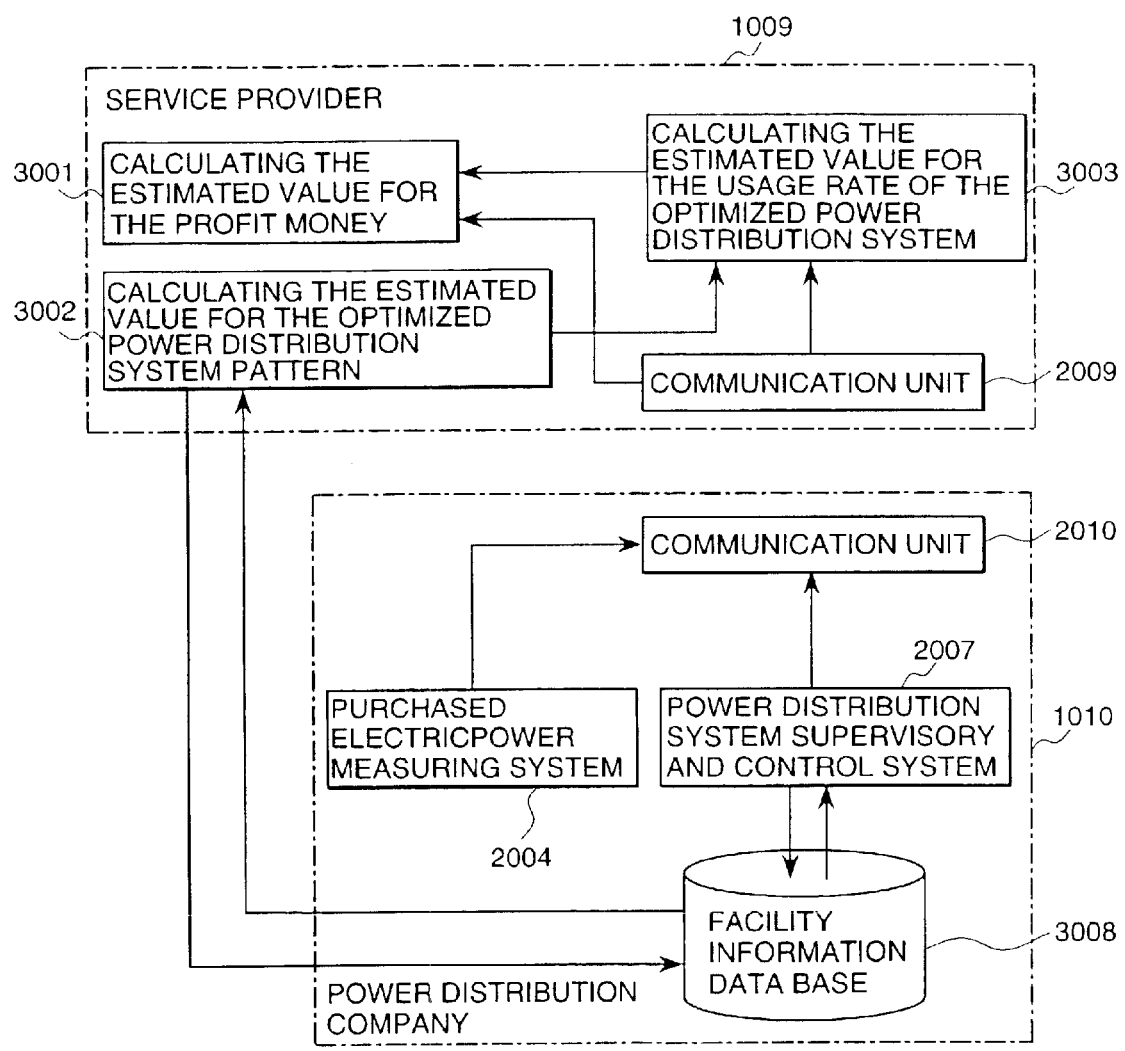
FIG. 6 is a block diagram illustrating an information flow in the power distribution efficiency increasing service in one embodiment of the present invention.

FIG. 6 is a block diagram showing the information flow in one embodiment of the power distribution efficiency increasing service in the present invention In the power distribution company 1010, the power distribution system supervisory and control system 2007 supervises and controls the power distribution system by using the facility information data base 3008, and the operation information is stored in the facility information data base 3008. The data of the purchased electric power volume obtained by the purchased electric power measuring system 2004 are transmitted to the service provider 1009 through the communication units 2010 and 2009.

In the service provider 1009, the estimated value of the usage rate of the optimized power distribution system is calculated 3003 based on the data received by the communication unit 2009 and the result of the calculation 3002 for estimating the optimum power distribution system pattern. The calculation 3002 for estimating the optimum power distribution system pattern is based on the facility information stored in the facility information data base. The facility information includes the impedance of the power distribution lines and the position or distance information of the loads, the circuit breakers and the switches in the individual power distribution systems. The information stored in the facility information data base 3008 is supplied in an on-line or off-line mode to the calculation 3002 for estimating the optimum power distribution system pattern at the service provider 1009. The data obtained by the calculation 3002 for estimating the optimum power distribution system pattern are stored in an on-line or off-line mode into the facility information data base 3008 and then used for operating the power distribution system.

The calculation 3001 for estimating the profit money obtained by optimization is executed based on the data obtained by the calculation 3003 for estimating the usage rate of the optimized power distribution system and the operation information of the power distribution system and the purchased electric power volume received through the communication unit 2009.

Figure 7:
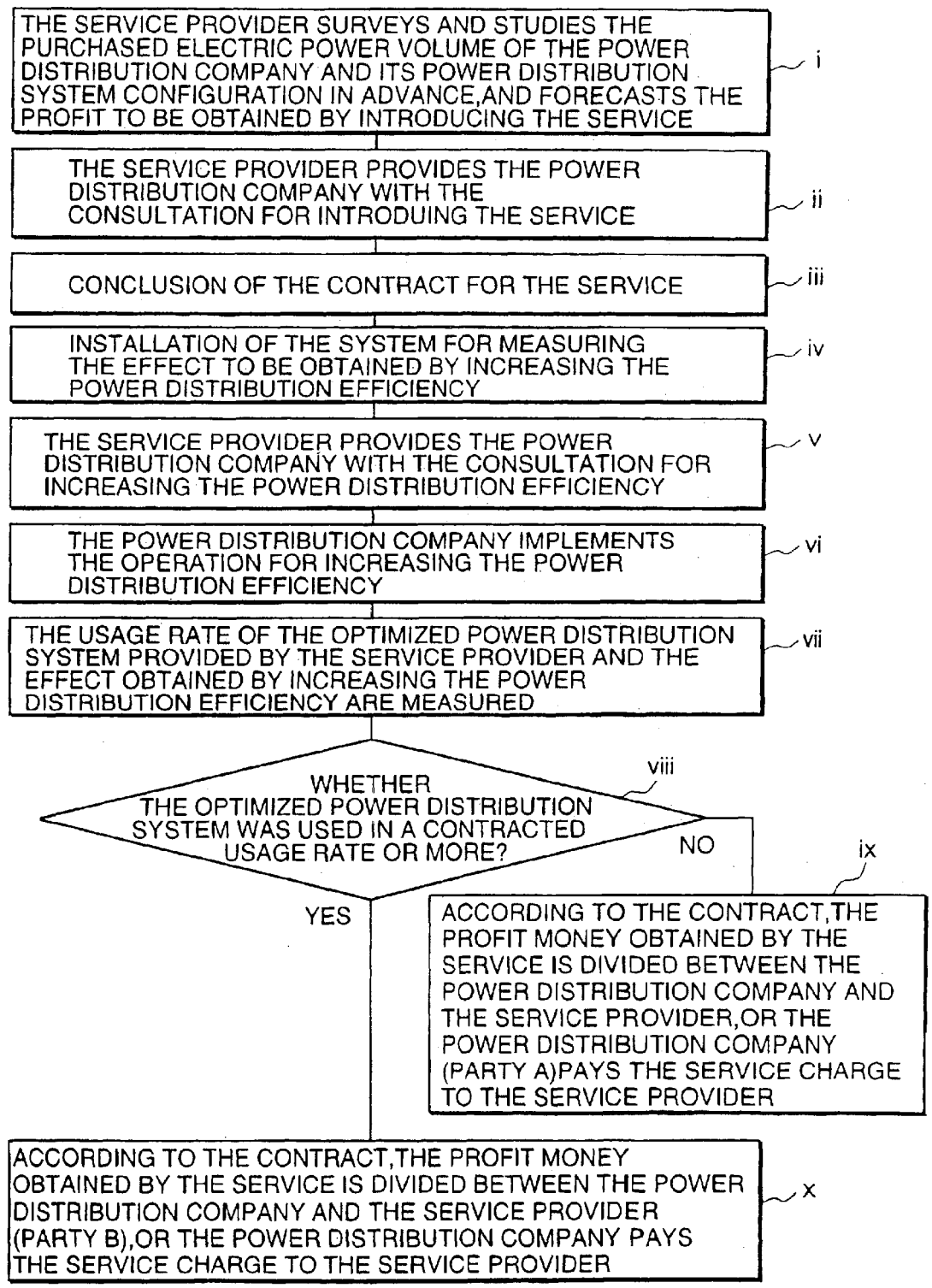
FIG. 7 is a flowchart illustrating a procedural flow in the power distribution efficiency increasing service in one embodiment of the present invention.

FIG. 7 is a flow chart showing a procedural flow of the power distribution increasing service in the embodiment illustrating one mode of the present invention. At first, the service provider 1009 surveys and studies the purchased electric power volume of the power distribution company and its power distribution system configuration, and forecasts the profit to be obtained by introducing the service (Step i). Next, the service provider 1009 provides the power distribution company 1010 with the consultation for introducing this service (Step ii). Next, the contract for this service is concluded (Step iii).

After concluding the contract, the system for measuring the effect obtained by increasing the power distribution efficiency is installed (Step iv). Next, the consultation for increasing the power distribution efficiency is provided to the power distribution company by the service provider 1009 (Step v).

Next, the power distribution company implements the operation for increasing the power distribution efficiency (Step vi), and then the usage rate of the optimized power distribution system provided by the service provider and the effect obtained by increasing the power distribution efficiency are measured (Step vii).

Thereafter, whether the optimized power distribution system was used in a contracted usage rate or more is judged (Step viii), and if the usage rate does not reach a designated value, the profit money obtained by the service is divided appropriately as contracted between the power distribution company 1010 and the service provider 1009, or the power distribution company 1010 passes the service charge to the service provider 1009 (Step ix). If the usage rate reaches or exceeds a designated value, the profit money obtained by the service is divided approximately as contracted between the power distribution company 1010 and the service provider 1009, or the power distribution company 1010 passes the service charge to the service provider 1009.

Though the outline of the power distribution efficiency increasing service and the power distribution efficiency increasing system is described above, what will be described concretely below is a method for correcting the measured value of the electric power volume purchased from the power generation company 1012 by the power distribution company 1010 and estimating the effect of the service.

Assume that the number of the power distribution substations located in the area covered by the service is n. Plural substations extracted randomly from the power distribution substations located in this service area or located in the areas adjacent to this service area are called base stations. Assume that the number of the base stations is m. The service is not applied to m base stations. In this condition, the electric power inflow into m base stations does not change before and after introducing the service, and thus is not influenced by the introduction of the service. In the following description, suppose at first such a case that the number of electric power customers does not change in order to simplify the explanation.

$Year_1$ represents a single year before introducing the service and $Year_2$ represents a single year after introducing the service. The ratio of the electric power flowing into the base stations in the period of $Year_1$ to the electric power flowing into the base stations in the period of $Year_2$ is supposed to be equal in a certain error range to the ratio of the electric power volume purchased by the power distribution company in the period of $Year_1$ covered by the introduced service to the electric power volume purchased by the power distribution company in the period of $Year_2$ without introducing the service.

The power distribution company 1010 and the service provider 1009 agree as contracted that the error between the ratios defined above is negligibly small enough, and that the effect of the service is estimated based on the ratio of the electric power flowing into the base stations before and after introducing the service.

Suppose that $PB_{year1}$ is the electric power volume purchased by the power distribution company 1010 in a single year ($Year_1$) before introducing the service, $PB_{year2}$ is the electric power volume purchased by the power distribution company 1010 in a single year ($Year_2$) after introducing the service, $PB'_{year2}$ is the electric power volume purchased by the power distribution company 1010 in a single year ($Year_2$) without introducing the service, $PI_{before}$ is the electric power flowing into the base stations in $Year_1$, $PI_{after}$ is the electric power flowing into the base stations in $Year_2$, the ratio of $PI_{after}$ to $PI_{before}$ is equal to the ratio Rbase between the changes in the electric power demand in $Year_1$ and $Year_2$ due to the climatic condition independent of the introduction of the service.

$$R_{base} = \frac{PI_{after}}{PI_{before}} \quad (1)$$

Then, in case that the service is not introduced in the period of $Year_2$, the ratio R of the electric power purchased from the power generation company by the power distribution company in the period of $Year_2$ to the electric power purchased in the period of can be expressed in the following formula.

$$R = \frac{PB'_{year2}}{PB_{year1}} = R_{base} + Err \quad (2)$$

Supposing that the ratio of the efficiency increased by the service is Rservice ($0 \leq$ service$<1$) and assuming that Err=0 in the formula 2, the following equation is satisfied.

$$PB_{after} = PB_{before} \times R_{base} \times (1 - R_{service}) \quad (3)$$

Next, Let us consider the increase or decrease in the number of the electric power customers, that is, the increase or decrease in the summation of the contracted volume of the retail electric power.

Figure 8:
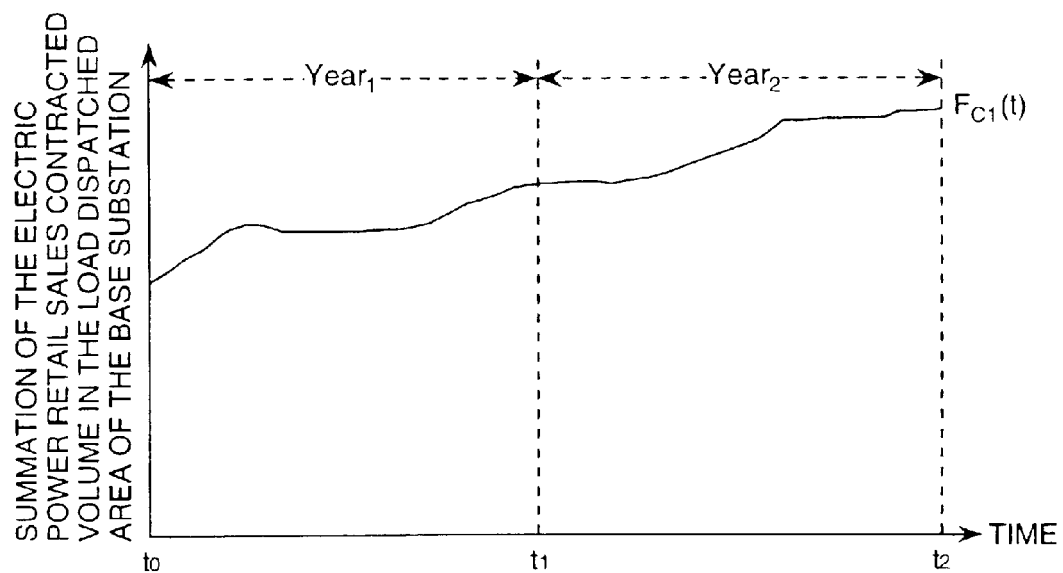
FIG. 8 is a characteristic chart illustrating examples of time shifting of the summation of the electric power retail sales contracted volume in the load dispatched area of the base substation.

At first, let us pay attention to $R_{base}$. As shown in FIG. 8, defining the change in the summation of the contracted volume of the retail electric power in the power distribution area of the base station to be a function $F_{c1}(t)$, the ratio $R'_{base}$ between the changes in the electric power demand in the periods of $Year_1$ and $Year_2$ due to the climatic condition independent of the introduction of the service for considering the above described correction can be expressed in the following formula.

$$R'_{base} = \frac{\int_{t0}^{t1} F_{c1}(t)dt}{\int_{t1}^{t2} F_{c1}(t)dt} \times R_{base} \quad (4)$$

Figure 9:
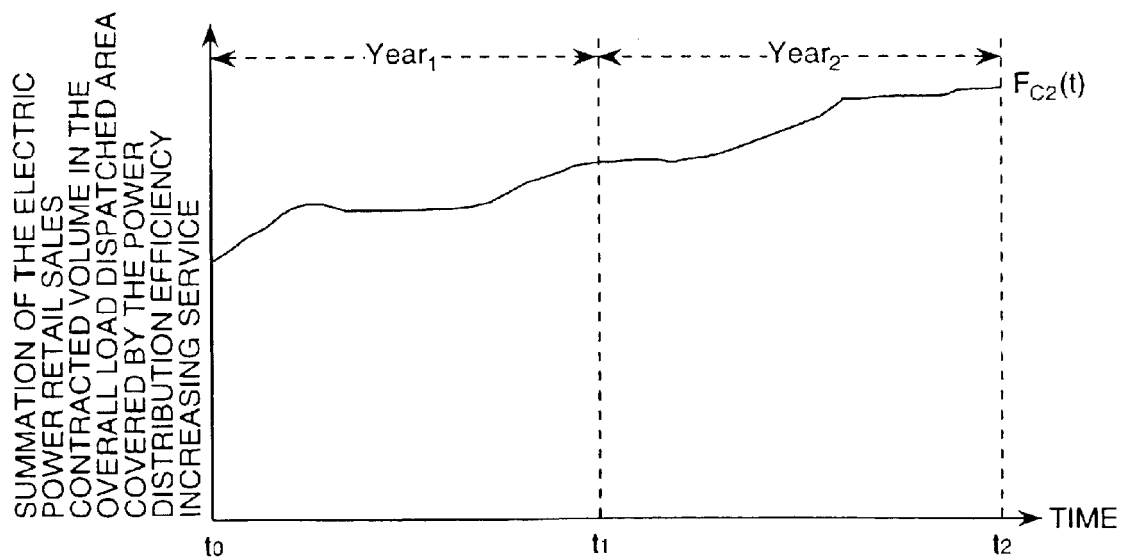
FIG. 9 is a characteristic chart illustrating an example of time shifting of the summation of the electric power retail sales contracted volume in the overall load dispatched area covered by the power distribution efficiency increasing service.

Similarly, as shown in FIG. 9, defining the change in the summation of the contracted volume of the retail electric power in the overall area of the service to be a function $F_{c2}(t)$, the formula 3 defined above can be expressed in the following formula.

$$PB_{after} = \frac{\int_{t0}^{t1} F_{c2}(t)dt}{\int_{t1}^{t2} F_{c2}(t)dt} = PB_{before} \times R'_{base} \times (1 - R_{service}). \quad (5)$$

Above expressions are based on such an assumption that the electric power demand due to the increase or decrease in the number of the electric power customers is proportional to the summation of the contracted volume of the retail electric power.

$$C_2 = \frac{\int_{t0}^{t1} F_{c2}(t)dt}{\int_{t1}^{t2} F_{c2}(t)dt} \quad (6)$$

The formula 6 gives the following formula.

$$R_{service} = \frac{PB_{after}}{PB_{before}} \times \frac{C_2}{R'_{base}} - 1 \quad (7)$$

The value obtained by multiplying the cost of the electric power purchased by the power distribution company in the period of Year$_2$ by R$_{service}$ as defined above is the profit money Y$_{profit}$ obtained by introducing the service.

Figure 10:
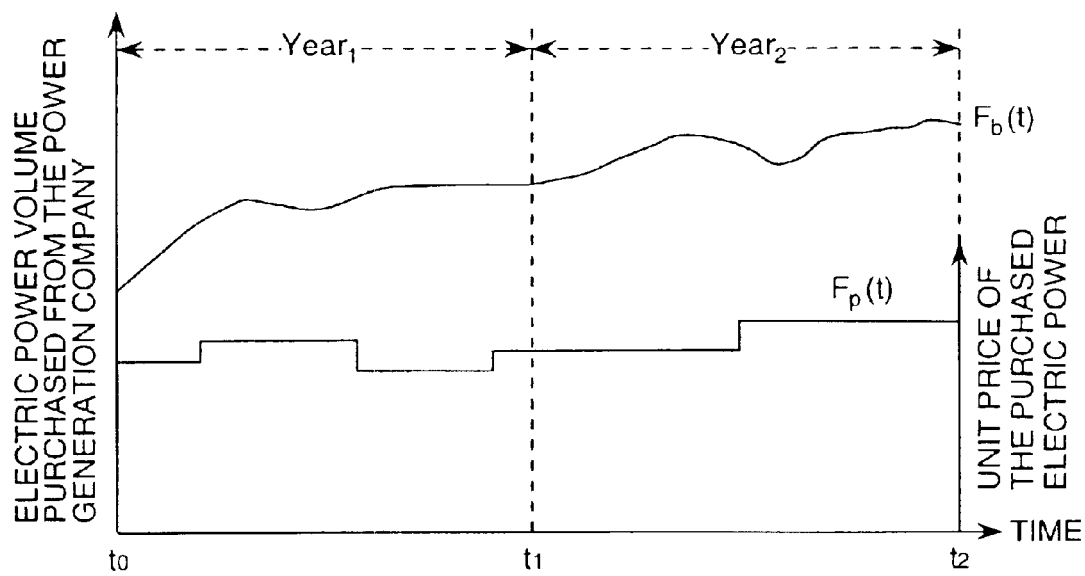
FIG. 10 is a characteristic chart illustrating an example of the time shifting of the electric power volume purchased from the power generation company and its unit price of the purchased electric power.

As shown in FIG. 10, suppose that the change in the unit price of the electric power purchased from the power generation company 1012 by the power distribution company 1010 is a function Fp(t), and that the change in the purchased electric power volume is expressed by function Fb(t), the profit money Yprofit obtained by introducing the service can be expressed by the following formula.

$$Y_{profit} = \int_{t1}^{t2} [F_p(t) \times F_b(t)] dt \times R_{service} \quad (8)$$

The profit money as defined above is divided between the power distribution company 1010 and the service provider 1009 according to the contract concluded between them.

In the service, it is required to make it a necessary condition to apply such an optimum power distribution network as described above with minimum power distribution loss to the practical power distribution operation in the service period of Year$_2$. This is because the practical power distribution operation is based on the subjective decision by the operators of the power distribution company 1010 with overall estimation of the economical efficiency, the reliability of the power distribution system, the reliability of the power supply and the easiness in the operation, and furthermore because the reliability of the power distribution system and the reliability of the power supply have a higher priority than the economical efficiency of the operation.

In case that the occurrence of applying the optimum distribution system with the minimum distribution loss in the period of Year is extremely low, the profit money Yprofit obtained by the service may be extremely low or it may be zero or negative in some occasions. For this reason, the lower bound Pmin for the occurrence of applying the optimum distribution system to the practical power distribution operation is determined in advance according to the contract concluded between the power distribution company 1010 and the service provider 1009, and if P$_{applied}$≧P$_{min}$, the profit money Y$_{profit}$ obtained by the service is divided between the power distribution company 1010 and the service provider 1009 based on the contract concluded between them as described above. On the other hand, if P$_{applied}$<P$_{min}$, the power distribution company 1010 pays the service charge for the service provided by the service provider 1009 in the periods of Year$_1$ and Year$_2$ to the service provider 1009 instead of dividing the profit money independent of the profit money Y$_{profit}$ being larger or small, or positive or negative.

The method of calculating P$_{applied}$, the occurrence of applying the optimum distribution system to the practical power distribution operation, is described below.

In this embodiment, the method of calculating P$_{applied}$ is based on the difference between the power distribution loss W$_{actual}$ in the actual power distribution system and the power distribution loss W$_{min}$ in the optimum power distribution system. As for the power distribution loss, the power distribution loss w1 for the single-phase wire system is generally obtained by the formula 9, and the power distribution loss for the three-phase three-wire system is generally obtained by the formula 10. Suppose that the load power is P, the line-to-line voltage is V, the load power factor is cos.θ, and the wiring impedance is R.

$$w1 = 2I^2R = 2\left(\frac{P}{V\cos\theta}\right)^2 R = \frac{2P^2R}{V^2\cos^2\theta} \quad (9)$$

$$w3 = 3I^2R = 2\left(\frac{P}{\sqrt{3}V\cos\theta}\right)^2 R = \frac{P^2R}{V^2\cos^2\theta} \quad (10)$$

Once the open-circuit and closed-circuit states of all the circuit breakers and the switches of the power distribution system in the service area, the summation of the power transmission loss in the actual power distribution system, W$_{actual}$, and the summation of the theoretical power distribution loss, W$_{min}$, in case of applying the optimum distribution system is applied fully to the load in the actual power distribution system can be obtained.

The occurrence of applying the optimum power distribution system to the actual power distribution system, P$_{applied}$, can be defined as in Formula 11, by using W$_{actual}$ and W$_{min}$.

$$P_{applied} = 1 - \frac{W_{actual} - W_{min}}{W_{min}} \quad (11)$$

Next, the occurrence of applying the optimum power distribution system to the actual power distribution system, P$_{applied\_year2}$, for the overall period of Year$_2$ is calculated.

Assuming that the power distribution loss in the actual power distribution system in a given day (day=i) is W$_{actual}$(i), and the theoretical power distribution loss in case of operating the load with the optimum power distribution system, P$_{applied\_year2}$ is obtained by Formula 12.

$$P_{applied\_year2} = 1 - \frac{\sum_{day=1}^{365} W_{actual}(day) - \sum_{day=1}^{365} W_{min}(day)}{\sum_{day=1}^{365} W_{min}(day)} \quad (12)$$

As described above, according to the present invention, the power distribution efficiency increasing service and the power distribution efficiency increasing system which can increase the efficiency of the power distribution operation without plant and equipment investment, and contribute to strengthening the baseline of the management operation of the power distribution company can be provided.

What is claimed is:

1. A power distribution efficiency increasing service providing method comprising the steps of:
   directing modification of a power distribution system by applying a predetermined proportion of a first pattern and a second pattern; and
   determining a charge based on an effect of said modification, wherein
   according to the first pattern, the power distribution system is optimized for reducing an electric power loss by modifying a combination of an open-circuit state and a closed-circuit state of circuit breakers or switches in said power distribution system; and
   according to the second pattern, the power distribution system is modified by modifying a layout of equipment of an electric circuit of the power distribution system, or by removing equipment from the electric circuit.

* * * * *